UNITED STATES PATENT OFFICE.

THEODORE F. LEHMANN, OF ALLEGHENY, PENNSYLVANIA.

IMPROVED METHOD OF RECOVERING WASTE ALKALI USED IN THE MANUFACTURE OF PAPER.

Specification forming part of Letters Patent No. 53,839, dated April 10, 1866.

*To all whom it may concern:*

Be it known that I, THEODORE F. LEHMANN, of the city and county of Allegheny, and State of Pennsylvania, have discovered a new and useful process by which to recover and restore to usefulness caustic alkali after it has been applied to crude fibrous vegetable substances for aiding in their reduction to fiber, of which the following is a specification.

From an analysis of a fluid in which a caustic alkali has been used as an agent for disintegrating fiber from vegetable substances it is found to contain chiefly organic matter, carbonate or spent soda or potash, and caustic soda or potash, the latter unspent or caustic portion remaining unspent from having become so surrounded by organic matter as to preclude its action and consequent conversion into a carbonate. It is evident from this that in order to recover the alkali from the fluid an equal condition or a union must be established between the carbonate and the caustic or unspent portion—viz., the carbonate must be made caustic or the caustic must be converted into a carbonate before the process of recovery can be expected to be successful. This conversion I have succeeded in effecting, and the following is a description of my process:

The fluid which has been used in the preparation of fibrous or other vegetable substances, holding, among other matter, caustic soda and carbonate of soda in solution, as described, is placed in an open vat, tank, or vessel. Into this fluid, which still contains an excess of caustic soda with other matter, I introduce carbonic-acid gas obtained from coal, coke, or any other suitable substance, which will be readily absorbed until the caustic soda has been, by absorption converted into a carbonate, as desired. Any suitable apparatus or contrivance may be used for the generation of carbonic-acid gas, to be introduced by pipes into the fluid until the caustic is converted into a carbonate, when, having to deal with the carbonate only, instead of both a carbonate and a caustic, the fluid may be evaporated by any of the known methods. When the fluid resulting from evaporation has attained a strength of 35° Baumé, or when crystallization begins to appear, it is transferred to a furnace and calcined. Leaching with boiling water is next proceeded with, and care should be had that each batch be subjected at least twice to the hot water, in order to regain in solution all the carbonate of the charred mass. Nor should more boiling water be used than is necessary for this operation, and the fluid be kept a few degrees above the required strength. The solution thus obtained is rendered caustic by the addition of well washed and slaked lime in the proportion of one pound of lime to one pound of soda or potash, and its strength increased; if necessary, by adding a fresh portion of caustic alkali, or decreased by water.

During the process of making the solution caustic it must be stirred until on the application of muriatic acid of 10° no effervescence occurs.

The advantages of my process are in the rapid reconversion of the unspent caustic to a carbonate, which renders the evaporation of the fluid under treatment practicable by removing the difficulties which exist when a caustic alkali and a carbonate are present during the application of heat.

I do not claim, broadly, the effect of carbonic acid for converting the caustic into a carbonate, as I know such a conversion would gradually take place from natural causes, provided it were practicable to subject the fluid to them; nor do I claim the use of carbonic acid when applied with a view of precipitating organic matter either in an open or a close vessel, as this I know has been attempted by other parties.

I do not limit myself to any particular method of generating, collecting, or applying the carbonic acid; but What I do claim as new, and desire to secure by Letters Patent of the United States, is—

Converting the unspent caustic alkali of alkaline solutions into a carbonate of the same by artificial application of carbonic acid.

T. F. LEHMANN.

Witnesses:
WM. H. PRESTON,
M. M. LIVINGSTON.